Aug. 26, 1947.  C. W. PAULSEN  2,426,369
SAMPLER
Filed April 28, 1945  2 Sheets-Sheet 1
Fig. 1
Fig. 3
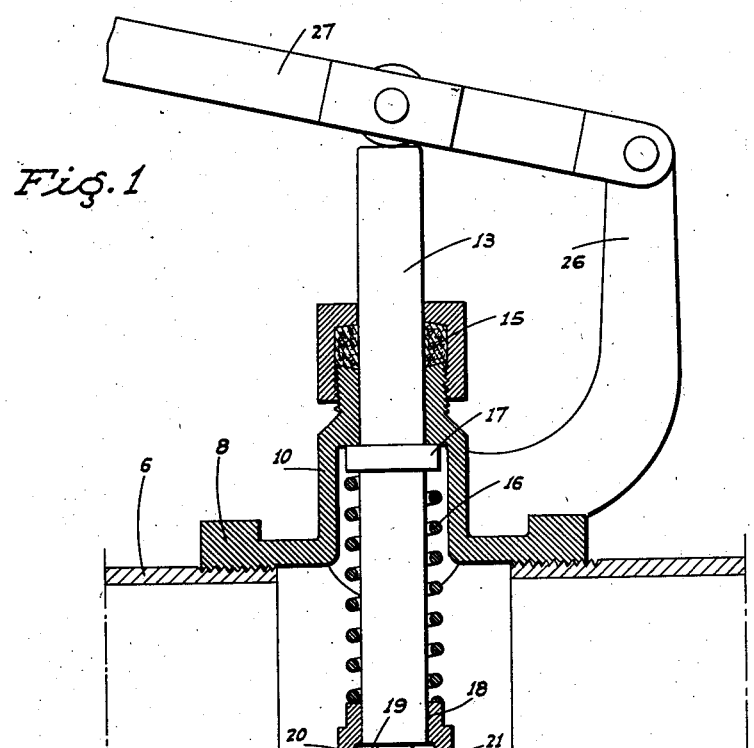
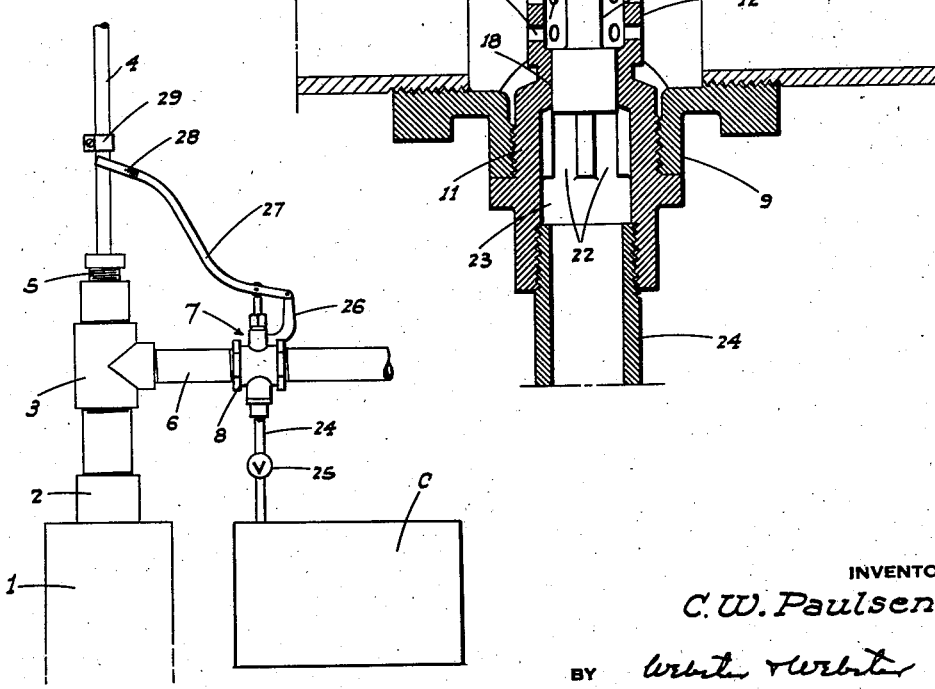
INVENTOR
C. W. Paulsen
BY Webster & Webster
ATTORNEYS

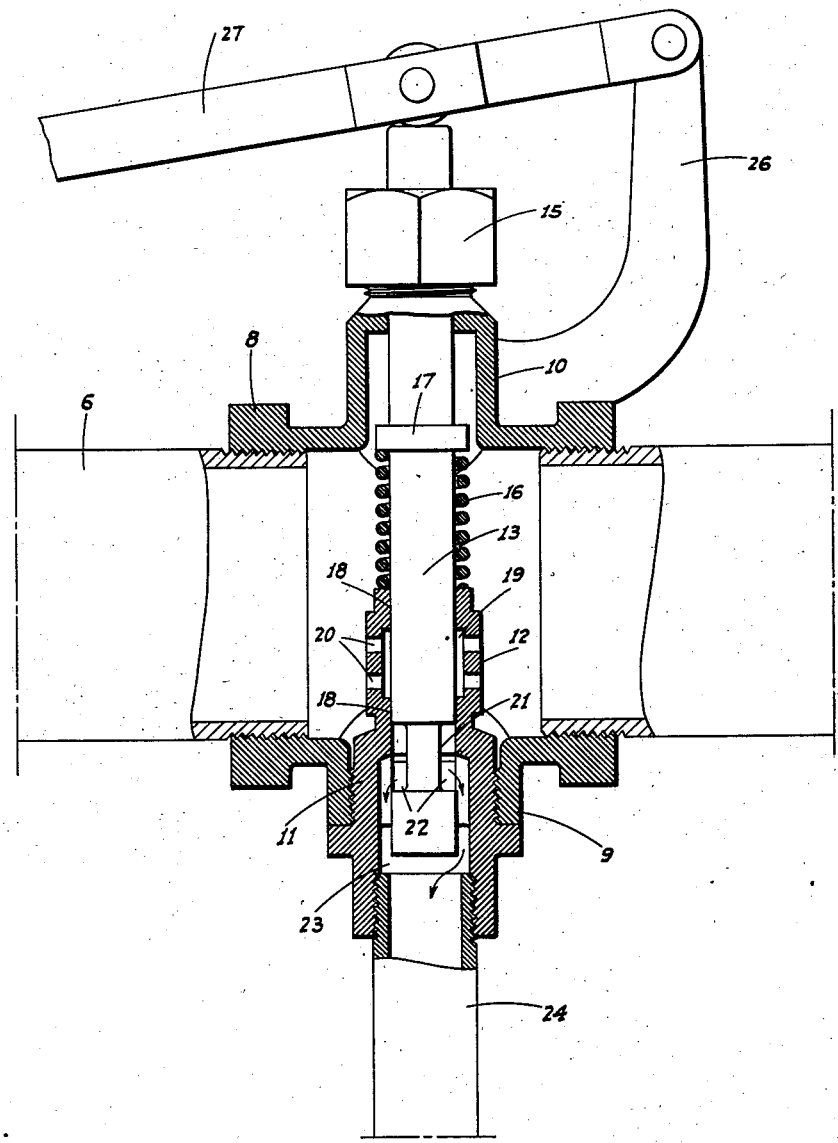

Patented Aug. 26, 1947

2,426,369

UNITED STATES PATENT OFFICE 2,426,369

SAMPLER

Clarence W. Paulsen, Taft, Calif.

Application April 28, 1945, Serial No. 590,916

2 Claims. (Cl. 73—422)

The present invention is directed to, and it is an object to provide, a sample taking device particularly adapted for use in connection with a flow pipe through which the liquid to be sampled passes as a stream.

Another object of the invention is to provide a sample taking device which is operative to automatically and intermittently withdraw a relatively small quantity of the fluid from a flow pipe, which quantities are accumulated in a receiver as a composite sample.

A further object of this invention is to provide a sample taking device, as in the preceding paragraph, especially designed for use in combination with oil well pumps whereby to accumulate, automatically, a composite but limited quantity sample of the oil pumped during a predetermined period, as, for example, every twenty-four hours.

An additional object of the invention is to provide a sample taking device which includes a plunger having a sample receiving groove or recess therein, the plunger being mounted and intermittently reciprocated so as to move the sample groove or recess between a receiving position in the flow stream to a discharge position clear of said stream and from which discharge position samples are fed to a receiving container.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a sectional elevation of the device with the plunger in sample receiving position.

Figure 2 is a similar view, but shows the plunger in sample discharging position.

Figure 3 is a side elevation, somewhat diagrammatic, of the device as incorporated in the flow pipe of an oil well pumping system.

Referring now more particularly to the characters of reference on the drawings, the device is here shown as arranged in combination with an oil well pumping system which includes a casing 1, and a tubing 2 having a T-fitting 3 interposed therein between the casing 1 and the polish rod 4 which extends upwardly from the tubing 2 through a packing gland 5; the polish rod being vertically reciprocated by means not shown, and supporting the sucker rod assembly of the pumping system. An outlet or flow pipe 6 is connected to the T-fitting 3. The above described arrangement is a conventional oil well pumping system, and the sample taking device which is the subject of the present invention, and which is indicated generally at 7, is embodied in such system as follows:

A fitting 8 is interposed in the flow pipe 6 and includes a pair of opposed bosses, indicated at 9 and 10, respectively; the boss 9 being at the bottom and tapped internally, while the boss 10 is on top and is formed with an exteriorly threaded neck, as shown.

An elongated tubular fitting or guide-way 11 is threaded into the boss 9 and includes a cage 12 which projects radially inwardly some distance and into the path of the stream which flows through the pipe 6 and fitting 8.

A vertical, cylindrical plunger 13 intersects the fitting 8 and slidably engages in the fitting 11, the upper end portion of said plunger 13 projecting through a packing gland 14 and a packing nut 15 about said gland on the threaded neck of boss 10. The upper end of the plunger 13 terminates at a point some distance above the packing nut 15. A compression spring 16 surrounds the plunger between the upper end of cage 12 and a fixed collar 17 on said plunger; the spring 16 urging the plunger 13 upwardly to a fully raised position, as shown in Fig. 1, and at which time the collar 17 abuts against the top portion of the boss 10 as a stop.

The lower end portion of the plunger 13 rides in the fitting 11 with a close running fit, being supported at the top and bottom of the cage 12 by bearing surfaces 18. Between the bearing surfaces 18 the cage 12 includes an enlarged cage chamber 19; there being a multiplicity of ports 20 opening therethrough whereby to establish communication between the inside of fitting 8 and the cage chamber 19.

The plunger 13 is formed, adjacent but short of its lower end, with an annular circumferential channel or groove 21 which is disposed so that it registers with the cage chamber 19 when the plunger 13 is in its raised position, as shown in Fig. 1.

When the plunger is raised, as above, the oil flowing through the pipe 6 and fitting 8 enters through the ports 20 into the chamber 19 and fills the oil receiving groove 21. Thereafter, upon downward movement of the plunger 13 to a position such that the oil groove 21 passes, in part at least, below the lowermost bearing surface 18, such groove registers with a plurality of circumferentially spaced longitudinal channels 22 formed in the tubular fitting 11 directly below said lowermost bearing surface 18, and through which channels the oil from groove 21 then escapes downwardly into a receiving chamber 23. From the lower end of the fitting 11 the oil flows from chamber 23 into a pipe 24 which leads to a receiving container C, there being a normally open shut-off valve 25 interposed in pipe 24. It will be seen that with intermittent reciprocation of the plunger 13 a relatively small sample is taken from the stream in the flow pipe 6 and fitting 8, and discharged into the receiving container C whereby to supply a composite sample of the oil which has been pumped during any given period of time. The plunger 13 is intermittently reciprocated for the above purpose and in timed relation to the pump surge of the pumping system, by means of the following arrangement:

A bracket arm 26 upstands from the fitting 8 alongside the upper end of the plunger 13, and an actuating lever 27, pivoted at one end on the bracket arm, extends across the upper end of the plunger 13 and thence upwardly toward the polish rod 4; the upper end of the lever 27 including a fork 28 which straddles the polish rod some distance above the packing gland 5. A collar 29 is fixed on the polish rod 4 above the fork 28 in position so that upon each down stroke of the polish rod 4, the lever 27 is lowered, whereby to depress the plunger 13 and discharge the accumulated oil sample from the groove 21. As the plunger is depressed and the sample discharged on the downstroke of the polish rod 4, said plunger is in its spring-raised and sample receiving position, as in Fig. 1, upon the up-stroke of the polish rod 4 and when the oil pumping system is causing a flow through the pipe 6.

While the sample taking device is described in combination with an oil well pumping system, such device may be put to other uses where it is desired to obtain, at intervals, a relatively small sample of the liquid flowing through a pipe, and whereby to give a composite sample for any given period of time.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A sampler comprising a fitting having an inlet and an outlet, for connection with a flow pipe, a recessed boss projecting outwardly from one side of the fitting, a recessed cage projecting into the said fitting at a point diametrically opposite said recessed boss, said cage having ports communicating with the interior of the fitting, a plunger guided through the recessed boss and cage and projecting to a point outside the boss, a collar on the plunger at a point inside the fitting, a compression spring interposed between the cage and said collar and normally functioning to hold the collar against the bottom of the recess of the boss, the plunger being provided with an annular groove which is in register with the ports in the cage when the collar is held against the bottom of the recess in the boss, a conduit leading from the fitting at a point in line with the cage, the plunger being operative to bring the annular groove therein into register with said conduit when the plunger is moved through the fitting against the compression of the spring, and a lever means arranged exteriorly of the fitting and operable to engage and so move the plunger.

2. A structure as in claim 1 in which the lever means comprises a bracket arm on the fitting, a lever pivoted to said arm, such lever crossing and normally resting on the projecting end of the plunger, and a reciprocating member operable to alternately engage and release the free end of the lever.

CLARENCE W. PAULSEN.

REFERENCES CITED

The following references are of record in the file of this patent:

UNITED STATES PATENTS

| Number | Name | Date |
|---|---|---|
| 228,532 | Hoyt | June 8, 1880 |
| 401,952 | Johnson | Apr. 23, 1889 |
| 1,157,860 | Gage | Oct. 26, 1915 |
| 1,837,858 | Grace | Dec. 22, 1931 |
| 2,140,920 | Myracle | Dec. 20, 1938 |
| 2,272,313 | Waters | Feb. 10, 1942 |
| 2,012,836 | Talbot et al. | Aug. 27, 1935 |
| 2,370,260 | Robison | Feb. 27, 1945 |